United States Patent
Yin et al.

(10) Patent No.: US 12,501,182 B2
(45) Date of Patent: Dec. 16, 2025

(54) IMAGE SENSING DEVICE AND IMAGE SENSING METHOD THEREOF

(71) Applicant: Guangzhou Tyrafos Semiconductor Technologies Co., Ltd., Guangzhou (CN)

(72) Inventors: Ping-Hung Yin, Hsinchu (TW); Jia-Shyang Wang, Miaoli County (TW); Jai-Jyun Shen, New Taipei (TW)

(73) Assignee: Guangzhou Tyrafos Semiconductor Technologies Co., Ltd., Guangzhou (CN)

( * ) Notice: Subject to any disclaimer, the term of this patent is extended or adjusted under 35 U.S.C. 154(b) by 315 days.

(21) Appl. No.: 18/199,992

(22) Filed: May 22, 2023

(65) Prior Publication Data

US 2023/0388650 A1 Nov. 30, 2023

Related U.S. Application Data

(60) Provisional application No. 63/345,920, filed on May 26, 2022.

(51) Int. Cl.
| | |
|---|---|
| *H04N 25/533* | (2023.01) |
| *G06T 5/50* | (2006.01) |
| *H04N 7/01* | (2006.01) |
| *H04N 23/56* | (2023.01) |
| *H04N 23/70* | (2023.01) |

(Continued)

(52) U.S. Cl.
CPC .............. *H04N 25/533* (2023.01); *G06T 5/50* (2013.01); *H04N 7/0127* (2013.01); *H04N 23/56* (2023.01); *H04N 23/70* (2023.01); *H04N 23/73* (2023.01); *H04N 23/741* (2023.01); *H04N 23/76* (2023.01); *H04N 23/951* (2023.01); *H04N 25/47* (2023.01); *H04N 25/50* (2023.01); *H04N 25/535* (2023.01); *H04N 25/58* (2023.01); *H04N 25/583* (2023.01); *H04N 25/59* (2023.01); *H04N 25/75* (2023.01); *H04N 25/77* (2023.01);

(Continued)

(58) Field of Classification Search
None
See application file for complete search history.

(56) References Cited

U.S. PATENT DOCUMENTS

| | | | |
|---|---|---|---|
| 2004/0155977 A1* | 8/2004 | Clark, II | H04N 23/71 348/E5.035 |
| 2005/0206757 A1* | 9/2005 | Itoh | H04N 25/00 348/E3.02 |

(Continued)

*Primary Examiner* — Quan Pham

(57) ABSTRACT

The invention relates to an image sensing device and an image sensing method thereof. The image sensing device includes: an image sensing array and an image processing circuit. The image sensing array generates multiple pixel data, and the pixel data includes a first pixel data and a second pixel data. The first pixel data is generated by exposing for a first exposure time, the second pixel data is generated by exposing for a second exposure time, and the first exposure time is shorter than the second exposure time. The image processing circuit executes an automatic exposure convergence operation with the first pixel data to generate new exposure parameters for the automatic exposure convergence operation. The second exposure time is adjusted according to the new exposure parameters, so that the second pixel data is pixel data with changed exposure time.

10 Claims, 17 Drawing Sheets

(51) Int. Cl.
*H04N 23/73*     (2023.01)
*H04N 23/741*    (2023.01)
*H04N 23/76*     (2023.01)
*H04N 23/951*    (2023.01)
*H04N 25/47*     (2023.01)
*H04N 25/50*     (2023.01)
*H04N 25/535*    (2023.01)
*H04N 25/58*     (2023.01)
*H04N 25/583*    (2023.01)
*H04N 25/59*     (2023.01)
*H04N 25/75*     (2023.01)
*H04N 25/77*     (2023.01)
*H04N 25/78*     (2023.01)

(52) U.S. Cl.
CPC ... *H04N 25/78* (2023.01); *G06T 2207/20208* (2013.01); *G06T 2207/20221* (2013.01)

(56) References Cited

U.S. PATENT DOCUMENTS

2014/0347532 A1* 11/2014 Kang .................... H04N 25/704
                                                    348/294
2015/0163395 A1*  6/2015 Konishi ................. H04N 25/70
                                                    348/230.1

* cited by examiner

IMAGE SENSING DEVICE AND IMAGE SENSING METHOD THEREOF

CROSS-REFERENCE TO RELATED APPLICATION

This application claims priority of U.S. provisional application No. 63/345,920, filed on May 26, 2022, the content of which is incorporated herein in its entirety by reference.

BACKGROUND OF THE INVENTION

1. Field of the Invention

The present invention relates generally to an image sensing device, and more particularly, to an image sensing device and an image sensing method thereof.

2. The Prior Arts

In recent years, the demand of the self-driving car industry has become increasingly vigorous. For self-driving cars, an image sensor for detecting real-time road conditions is an essential component. The dynamic vision sensor (DVS) is a mainstream image sensor used for detecting real-time road conditions. The reason is that the DVS records images in units of events. This dynamic event-based sensor brings machine autonomy closer to reality, making it suitable for vision-based high-speed applications in the field of autonomous vehicles.

However, when driving on the road, the car may experience occasional situations where the illumination level changes drastically in a short period of time to cause partial (or all) temporary overexposure (or underexposure) of the image sensor. During this short period of time, the image recognition algorithm of the self-driving car cannot make correct object detection due to insufficient detail images, thus increasing the risk of the accidents. Therefore, how to improve the image sensing device so that it can quickly adjust the exposure level at a very high frame rate is an urgent problem to be solved by researchers.

High-Dynamic Range (HDR) imaging is mainly a set of imaging techniques that allow the capture and representation of a large dynamic range of illuminance between the brightest and darkest regions of an image, as opposed to the standard digital imaging techniques. Wider dynamic range allows high dynamic range images to more accurately represent the wide range of intensity levels seen in real-world scenes. One method for capturing high dynamic range images involves the merging of a plurality of independently captured photographs. For example, the processing procedure may include successively capturing a plurality of images at different exposures, and then processing the images to generate a composite high dynamic range image.

However, the process of generating high dynamic range images from a plurality of independently captured images has drawbacks. For example, when merging a plurality of independently captured images, generally a plurality of images with shorter exposure times are superimposed to obtain a better image. However, when the image is in a low-light environment, the image with a short exposure time cannot receive any signal during the short exposure time, resulting in the combination still failing to produce a high dynamic range image.

Therefore, the present invention is proposed to address the aforementioned deficiency.

SUMMARY OF THE INVENTION

A primary objective of the present invention is to provide an image sensing device, which generates a plurality of pixel data through an image sensing array, and the pixel data includes a first pixel data and a second pixel data, the first pixel data is by exposing for a first exposure time, the second pixel data is generated by exposing for a second exposure time, the first exposure time is shorter than the second exposure time, and an image processing circuit executes an automatic exposure convergence operation through the first pixel data. As such, the automatic exposure convergence operation is performed through the first pixel data with a higher exposure frequency to achieve the effect of quickly completing the auto-exposure.

In order to achieve the above objective, the present invention provides an image sensing device, comprising: an image sensing array, further comprising a plurality of sensing units, for generating a plurality of pixel data respectively; a processing circuit, coupled to the image sensing array; wherein, the plurality of pixel data comprises a first pixel data and a second pixel data, the first pixel data is generated by exposing for a first exposure time, and the second pixel data is generated by exposing for a second exposure time, the first exposure time is shorter than the second exposure time, and the image processing circuit performs an automatic exposure convergence operation through the first pixel data to generate a plurality of new exposure parameters of the automatic exposure convergence operation, and adjusts the second exposure time according to the exposure parameters, so that the second pixel data is the pixel data with changed exposure time.

Preferably, according to the image sensing device of the present invention, the image processing circuit performs image fusion according to the plurality of pixel data with different exposure times to generate an image information.

Preferably, according to the image sensing device of the present invention, the sensing units have an image sensing structure, the image sensing structure comprises: a photodiode; a transmission circuit, coupled to the photodiode; a reset circuit, coupled to the transmission circuit; wherein, the reset circuit is used to receive a reset signal, the transmission circuit is used to receive a transmission signal, the reset circuit resets the charge in the photodiode according to the reset signal, and the transmission circuit converts the charge accumulated in the photodiode into the pixel data according to the transmission signal.

Preferably, according to the image sensing device of the present invention, at least a part of the sensing units is a first sensing unit, the reset circuit of the first sensing unit receives a first reset signal, and the transmission circuit of the first sensing unit receives a first transmission signal, and the time difference between the first reset signal and the first transmission signal is the first exposure time.

Preferably, according to the image sensing device of the present invention, at least a part of the sensing units is a second sensing unit, the reset circuit of the second sensing unit receives a second reset signal, and the transmission circuit of the second sensing unit receives a second transmission signal, and the timing of the second transmission signal is between the first reset signal and the second reset signal.

Preferably, according to the image sensing device of the present invention, at least a part of the sensing units is a third sensing unit, the reset circuit of the third sensing unit receives a third reset signal, and the transmission circuit of the third sensing unit receives a third transmission signal, and the timing of the third transmission signal is between the second reset signal and the third reset signal.

Preferably, in the image sensing device according to the present invention, the time difference between the third reset signal and the third transmission signal of each sensing unit is the second exposure time.

Preferably, according to the image sensing device of the present invention, at least a part of the sensing units is a fourth sensing unit, the reset circuit of the fourth sensing unit receives a fourth reset signal, and the transmission circuit of the fourth sensing unit receives a fourth transmission signal, and the timing of the fourth transmission signal is between the third reset signal and the fourth reset signal.

Preferably, according to the image sensing device of the present invention, the time difference between the fourth reset signal and the fourth transmission signal of each sensing unit is the second exposure time.

Preferably, according to the image sensing device of the present invention, the image sensing device further comprises a plurality of filters, and the filters comprise a white filter, a red filter, a green filter, and a blue filter; the white light filter is disposed on the first sensing unit, the red light filter is disposed on the second sensing unit, the green light filter is disposed on the third sensing unit, and the blue light filter is disposed on the fourth sensing unit.

Preferably, according to the image sensing device of the present invention, the sensing units further comprise a control circuit coupled to the transmission circuit and the reset circuit, the control circuit is used to generate the transmission signal and the reset signal.

Preferably, according to the image sensing device of the present invention, the control circuit comprises a first exposure control circuit and a second exposure control circuit, the first exposure control circuit is used to generate the first transmission signal and the first reset signal, the second exposure control circuit is used to generate the second transmission signal and the second reset signal.

Preferably, according to the image sensing device of the present invention, the image sensing array is a multi-frame rate array, the image processing circuit uses the first pixel data which has shorter exposure time and higher frame rate to perform the automatic exposure convergence operation, and when the first pixel data finishes the automatic exposure convergence after the time of a plurality of first frames, the second pixel data is still within the time of one frame of the second frame rate.

Preferably, the image sensing device according to the present invention further comprises an image buffer coupled to the image processing circuit, and the image buffer is used to store the pixel data.

Also, in order to achieve the above objective, the present invention further provides an image sensing method based on the aforementioned image sensing device, comprising: a plurality of sensing units of an image sensing array respectively generating a plurality of pixel data, wherein the pixel data comprises a first pixel data and a second pixel data, the first pixel data is generated by exposing for a first exposure time, the second pixel data is generated by exposing for a second exposure time, the first exposure time is shorter than the second exposure time; and an image processing circuit performs an automatic exposure convergence operation on the first pixel data to generate a plurality of new exposure parameters of the automatic exposure convergence operation, and adjusts the second exposure time to make the second pixel data having a new exposure time.

Preferably, according to the image sensing method of the present invention, since the first exposure time is shorter than the second exposure time, the image processing circuit performs the automatic exposure convergence operation on the first pixel data, which has a higher frame rate to generate the new exposure parameters of the automatic exposure convergence operation, adjusts the second exposure time, and performs gain and exposure time length update when the second exposure is in progress but not yet completed.

Preferably, in the image sensing method according to the present invention, after the automatic exposure convergence operation, the new exposure parameters of the automatic exposure convergence operation are generated within one frame, and the second exposure time is adjusted and used on the second pixel related to the second pixel data.

Preferably, the image sensing method according to the present invention further comprises: the image processing circuit performing image fusion according to the pixel data with different exposure times to generate an image information.

In summary, the image sensing device provided by the present invention can achieve convergence through the automatic exposure convergence operation to adjust one or a combination of the exposure time, aperture size, and sensitivity of the image sensing structure, and the execution of the image fusion generates the high dynamic range image signal to achieve the objective of fast auto-exposure, and the execution of image fusion can facilitate presenting clear and vivid picture details under sudden and extreme changes in external light.

In order to make those skilled in the art understand the objectives, characteristics and effects of the present invention, the present invention is described in detail below by the following specific embodiments, and in conjunction with the attached drawings.

DETAILED DESCRIPTION OF THE PREFERRED EMBODIMENT

Figure 1:
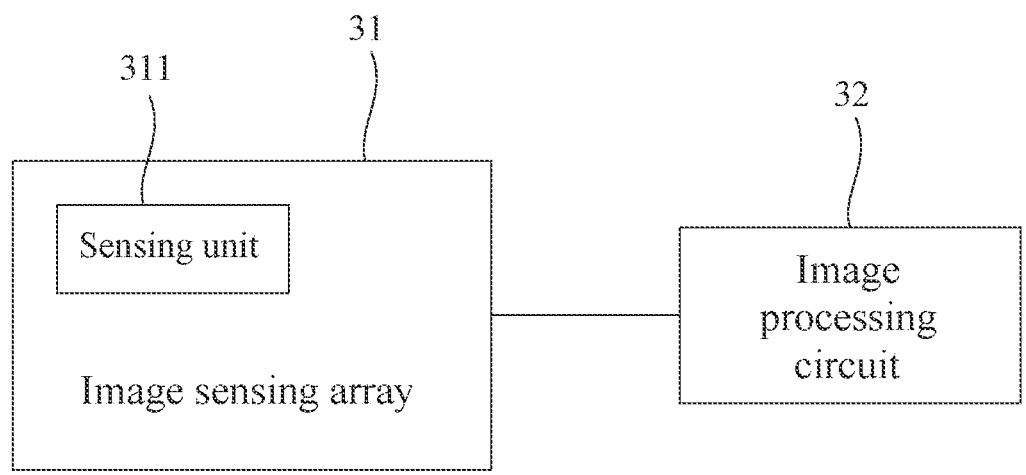
FIG. 1 is a schematic view showing an image sensing device according to the present invention.

The accompanying drawings are included to provide a further understanding of the invention, and are incorporated in and constitute a part of this specification. The drawings illustrate embodiments of the invention and, together with the description, serve to explain the principles of the invention.

The inventive concept will be explained more fully hereinafter with reference to the accompanying drawings in which exemplary embodiments of the inventive concept are shown. Advantages and features of the inventive concept and methods for achieving the same will be apparent from the following exemplary embodiments, which are set forth in more details with reference to the accompanying drawings. However, it should be noted that the present inventive concept is not limited to the following exemplary embodiments, but may be implemented in various forms. Accordingly, the exemplary embodiments are provided merely to disclose the inventive concept and to familiarize those skilled in the art with the type of the inventive concept. In the drawings, exemplary embodiments of the inventive concepts are not limited to the specific examples provided herein and are exaggerated for clarity.

The terminology used herein is used to describe particular embodiments only, and is not intended to limit the present invention. As used herein, the singular terms "a" and "the" are intended to include the plural forms as well, unless the context clearly dictates otherwise. As used herein, the term "and/or" includes any and all combinations of one or more of the associated listed items. It will be understood that when an element is referred to as being "connected" or "coupled" to another element, it can be directly connected or coupled to the other element or intervening elements may be present.

Similarly, it will be understood that when an element (e.g., a layer, region, or substrate) is referred to as being "on" another element, it can be directly on the other element or intervening elements may be present. In contrast, the term "directly" means that no intervening elements are present. It should be further understood that when the terms "comprising" and "including" are used herein, it is intended to indicate the presence of stated features, steps, operations, elements, and/or components, but does not exclude one or more other features, steps, operations, elements, components, and/or the presence or addition of groups thereof.

Furthermore, exemplary embodiments in the detailed description are set forth in cross-section illustrations that are idealized exemplary illustrations of the present inventive concepts. Accordingly, the shapes of the exemplary figures may be modified according to manufacturing techniques and/or tolerable errors. Therefore, the exemplary embodiments of the present inventive concept are not limited to the specific shapes shown in the exemplary figures, but may include other shapes that may be produced according to the manufacturing process. The regions illustrated in the figures have general characteristics and are used to illustrate specific shapes of elements. Therefore, this should not be considered limited to the scope of this creative concept.

It will also be understood that, although the terms "first," "second," "third," etc. may be used herein to describe various elements, these elements should not be limited by these terms. These terms are only used to distinguish each element. Thus, a first element in some embodiments could be termed a second element in other embodiments without departing from the teachings of the present creation. Exemplary embodiments of aspects of the present inventive concept illustrated and described herein include their complementary counterparts. Throughout this specification, the same reference numbers or the same designators refer to the same elements.

Furthermore, example embodiments are described herein with reference to cross-sectional and/or planar views, which are illustrations of idealized example illustrations. Accordingly, deviations from the shapes shown, for example, caused by manufacturing techniques and/or tolerances, are expected. Accordingly, the exemplary embodiments should not be considered limited to the shapes of the regions shown herein, but are intended to include deviations in shapes resulting from, for example, manufacturing. Thus, the regions illustrated in the figures are schematic and their shapes are not intended to illustrate the actual shape of a region of a device and are not intended to limit the scope of example embodiments.

Figure 2:
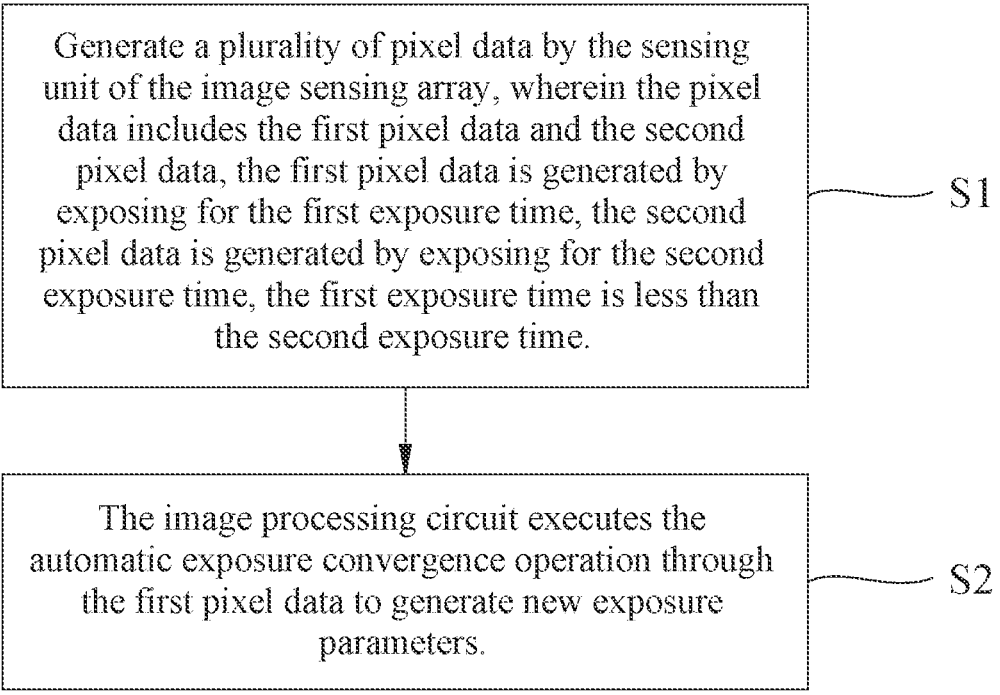
FIG. 2 is the steps of an image sensing method according to the present invention.
Figure 3:
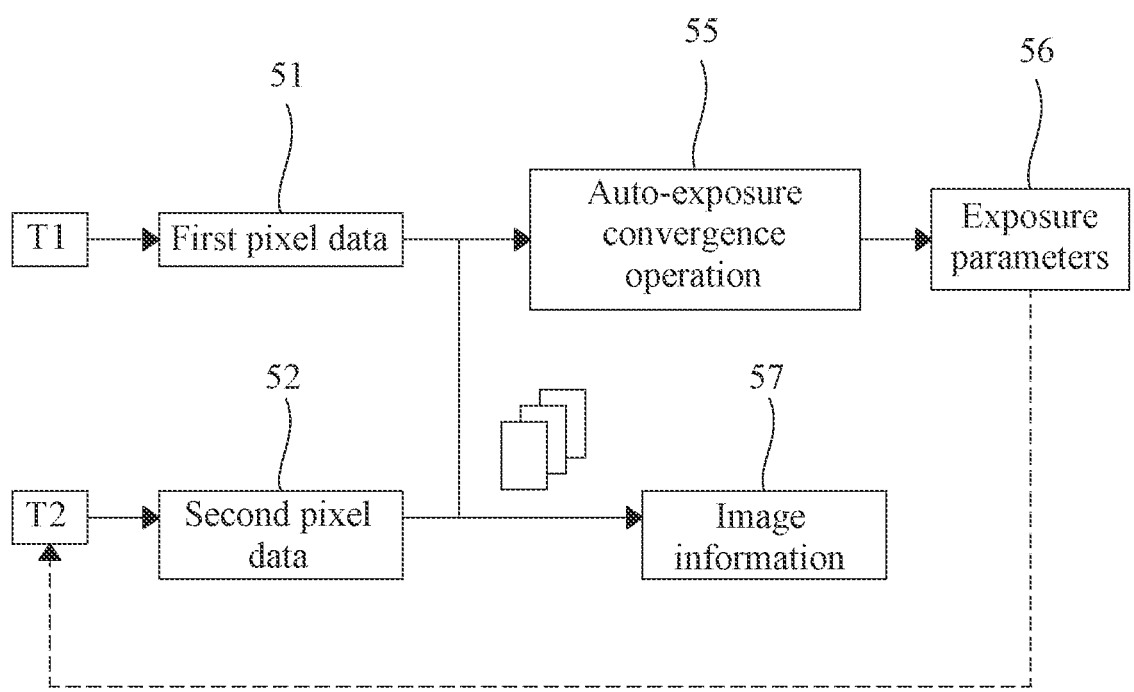
FIG. 3 is a flowchart illustrating an image sensing device actually executing an image sensing method according to an example of the present invention.

Referring to FIGS. 1-3, FIG. 1 is a schematic view of an image sensing device according to the present invention; FIG. 2 shows the steps of an image sensing method according to the present invention; FIG. 3 is a flowchart illustrating an image sensing device actually executing an image sensing method according to an example of the present invention. As shown in FIG. 1, an image sensing device 300 according to the present invention includes: an image sensing array 31 and an image processing circuit 32.

Specifically, as shown in FIG. 1-2, the image sensing array 31 according to the present invention includes a plurality of sensing units 311, and the sensing unit 311 generates a plurality of pixel data respectively. The pixel data includes a first pixel data 51 and a second pixel data 52. For example, the first pixel data 51 and the second pixel data 52 are respectively related to the first pixel (not shown) and the second pixel (not shown). The second pixel data 51 is generated by exposing for a first exposure time T1, and the second pixel data 52 is generated by exposing for a second exposure time T2. The first exposure time T1 is shorter than the second exposure time T2. The frame rate of the first pixel data 51 is F1, and the frame rate of the second pixel data 52 is F2. F1 is greater than F2. Usually, F1 is at least greater than F2 by two times. But the present invention is not limited thereto. In some embodiments, the sensing unit 311 may include an image sensing structure, but the invention is not limited thereto.

Specifically, as shown in FIG. 1, the image processing circuit 32 of the present invention is coupled to the image sensing array 31, and the image processing circuit 32 is used to operate and process the pixel data generated by the image sensing array 31. In some embodiments, the image processing circuit 32 may be further coupled to an image frame buffer, which is mainly used to store the aforementioned pixel data, so as to automatically perform exposure convergence operation or image fusion on the pixel data, but the invention is not limited thereto.

It should be further explained that since the present invention relates to an automatic exposure (or shortly, auto-exposure) convergence operation, the automatic exposure will be described first below. As shown in FIG. 3, automatic exposure is a mechanism that refers to that the image sensing device automatically adjusts exposure and gain according to the light intensity in the environment, so that the brightness of the image is getting closer to an automatic exposure target range (not shown), thus preventing excessive or deficient exposure. The present invention performs real-time calculations through the pixel data 51. After the automatic exposure convergence operation, new exposure parameters 56 will be generated, and the new exposure parameters 56 will be configured to affect the second exposure time T2, so that the pixel data 52 converges to an auto-exposure target range. In some embodiments, the exposure parameters 56 may include gain, exposure time, aperture size, and sensitivity, etc., wherein the sensitivity refers to the sensitivity of the photodiode to light, and increasing the sensitivity can make the generated image brighter. The aperture control can adjust the instantaneous amount of incoming light. Therefore, the image sensing device 300 according to the present invention can achieve fast convergence and stable convergence. Since the automatic exposure convergence operation is familiar to those skilled in the art, the detailed description will not be repeated here.

For further understanding of the structural features, use of technical means and the expected effect of the present invention, the following describes the use of the present invention. Refer to FIGS. 1-3, the image sensing method according to the present invention comprises the following steps:

Step S1: generating a plurality of pixel data by the sensing unit 311 of the image sensing array 31, wherein the pixel data includes the first pixel data 51 and the second pixel data 52, the first pixel data 51 is generated by exposing for the first exposure time T1, the second pixel data 52 is generated by exposing for the second exposure time T2, the first exposure time T1 is less than the second exposure time T2; the frame rate of the first pixel data 51 is F1, the frame rate of the second pixel data 52 is F2, and F1 is greater than F2. Usually, F1 is at least greater than F2 by 2 times. But the present invention is not limited thereto.

Step S2: the image processing circuit 32 executes the automatic exposure convergence operation 55 through the first pixel data 51 to generate new exposure parameters; here, for example, real-time calculation will be performed with the pixel data 51, and after the automatic exposure convergence operation, new exposure parameters will be generated, and the new exposure parameters 56 will be configured to affect the second exposure time T2, so that the pixel data 52 converges to the auto-exposure target range. It should be noted that when the second pixel performs the exposure of the N-th frame but has not yet ended, if the new exposure parameter 56 is received, the exposure time can be updated immediately during the frame that is, the intra-frame update. The new exposure parameters 56 do not need to wait until the start of the next frame (frame N+1).

Figure 4:
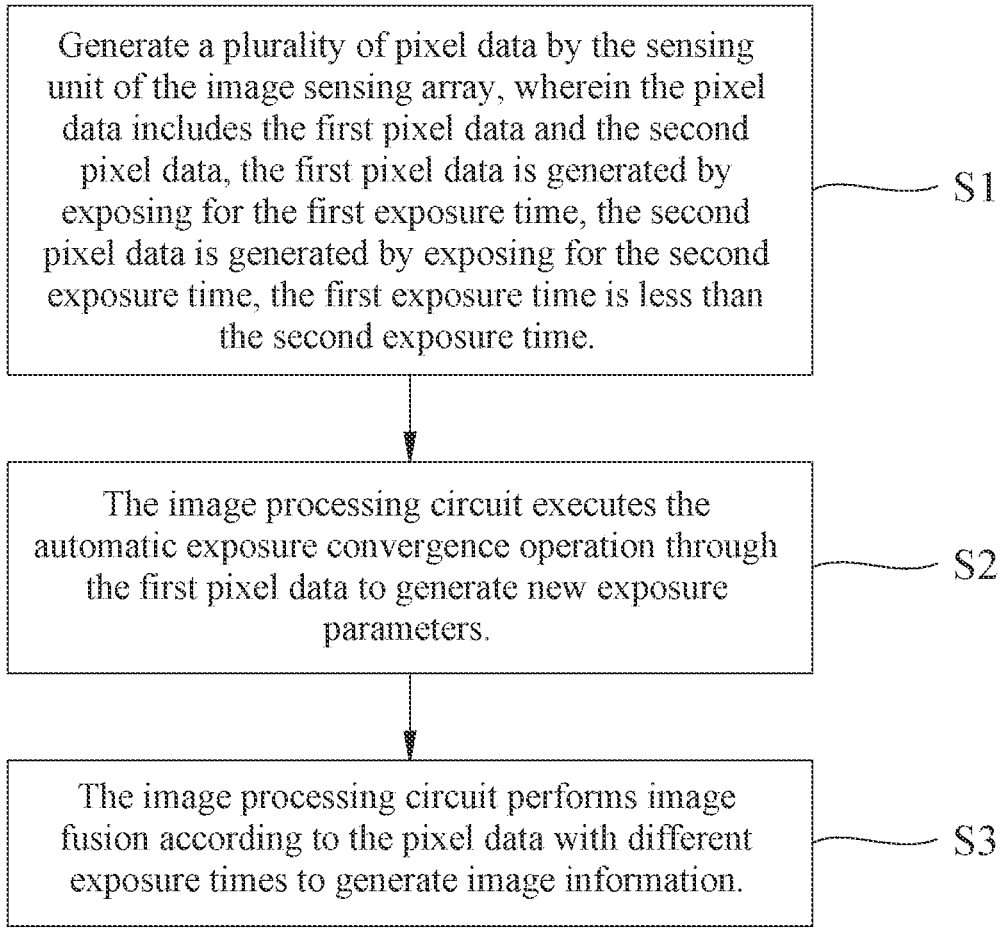
FIG. 4 is another view of the steps of the image sensing method according to the present invention.

Refer to FIG. 4. FIG. 4 is another view of the steps of the image sensing method according to the present invention. In some embodiments, the image sensing method according to the present invention may further include the following steps:

Step S3: The image processing circuit 32 performs image fusion according to the pixel data (first pixel data 51, second pixel data 52) with different exposure times to generate image information 57.

It is worth mentioning that, in some embodiments, step S2 can be executed once or multiple times. When the above steps are executed multiple times, it can be further ensured that the automatic exposure convergence operation of the present invention converges to the automatic exposure target range. Also, the automatic exposure is completed quickly, which improves the stability of the image sensing device of the present invention, but the present invention is not limited thereto.

Thus, it can be seen from the above description that the image sensing method according to the present invention utilizes the image sensing array 31, which is a multi-frame rate array, and performs the automatic exposure convergence operation 55 on the first pixel data 51, which has a shorter exposure time and a higher frame rate. When the first pixel data 51 completes the automatic exposure convergence after the period of multiple first frames, the second pixel data 52 is still within a frame time of the second frame rate. The new exposure parameter 56 generated according to the automatic exposure convergence operation 55 is applied to the control circuit 14, so that the second pixel exposure time T2 is changed to obtain the second pixel data 52, and then the image fusion is performed on the first pixel data 51 and the second pixel data 52 to generate the image information 57 to implement an image sensing device 300 that can converge to the target range of auto-exposure in a relatively short time, achieving low-latency auto-exposure convergence and improving image clarity.

Hereinafter, referring to the drawings, the embodiment of the first embodiment of the image sensing device of the present invention will be described, so that those skilled in the art of the present invention can understand possible changes more clearly. Components denoted by the same reference numerals as above are substantially the same as those described above with reference to FIGS. 1-4. The same elements, features, and advantages as those of the image sensing device 300 will not be repeated.

Figure 5:
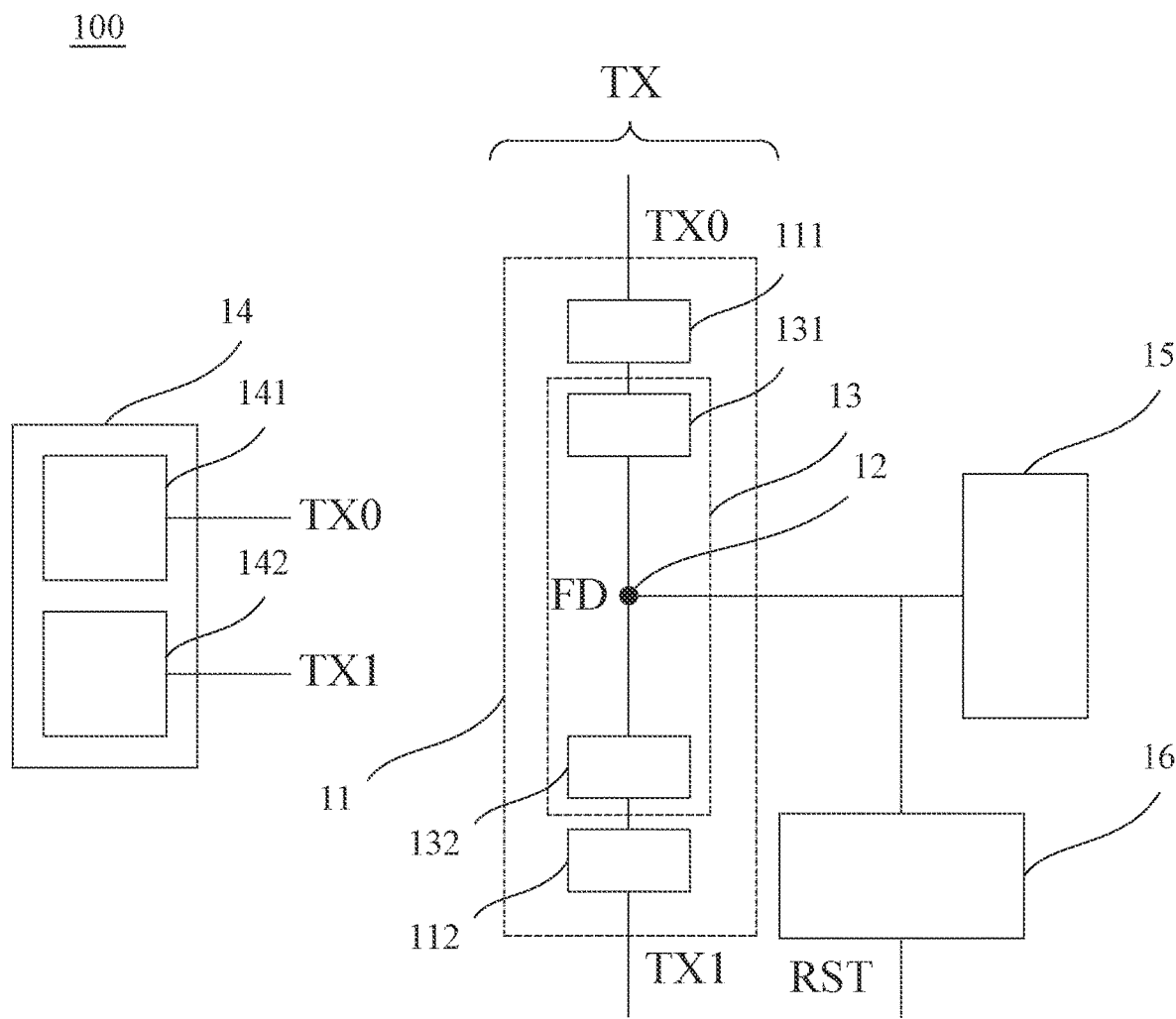
FIG. 5 is a schematic view of an image sensing structure according to a first embodiment of the present invention.
Figure 6:
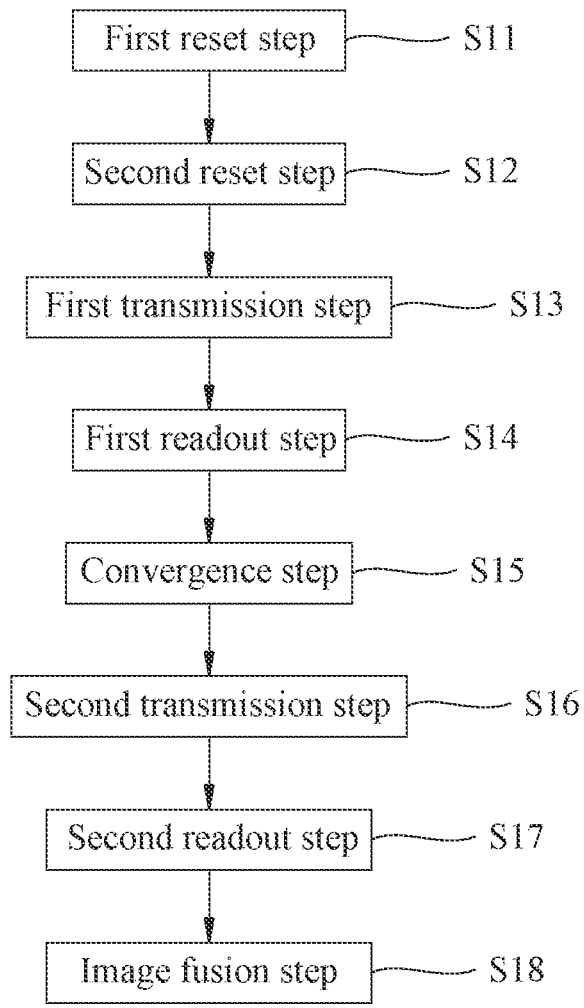
FIG. 6 is a view of the steps of an image sensing method according to a first embodiment of the present invention.
Figure 7:
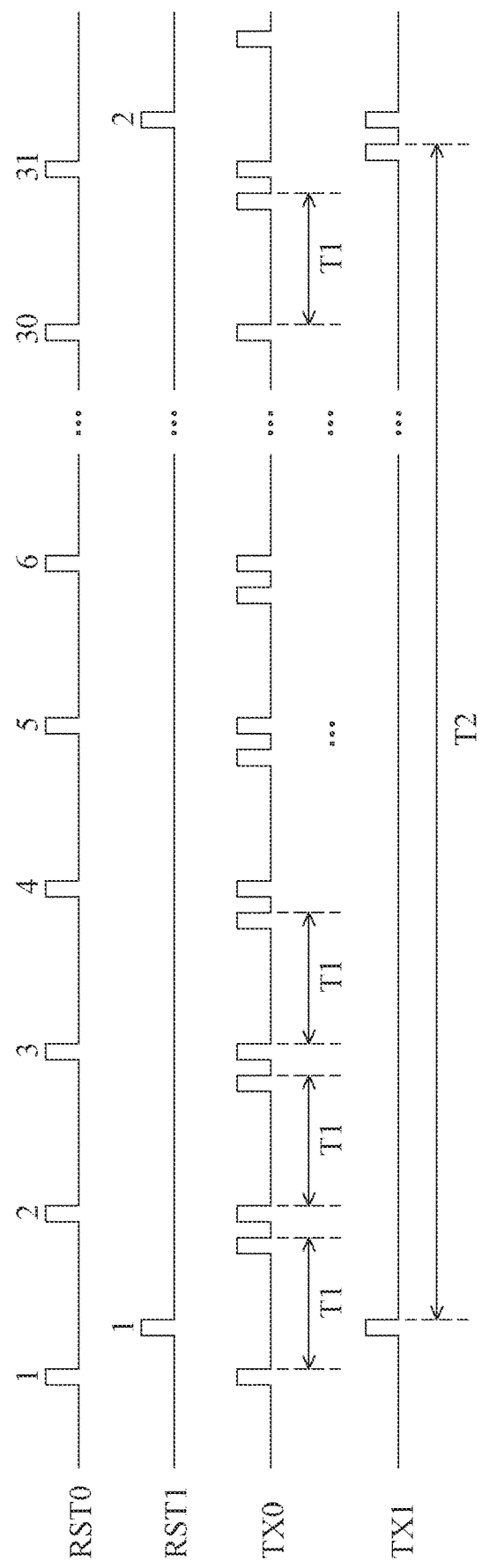
FIG. 7 is a schematic view illustrating the signals of an image sensing method according to the first embodiment of the present invention.
Figure 8:
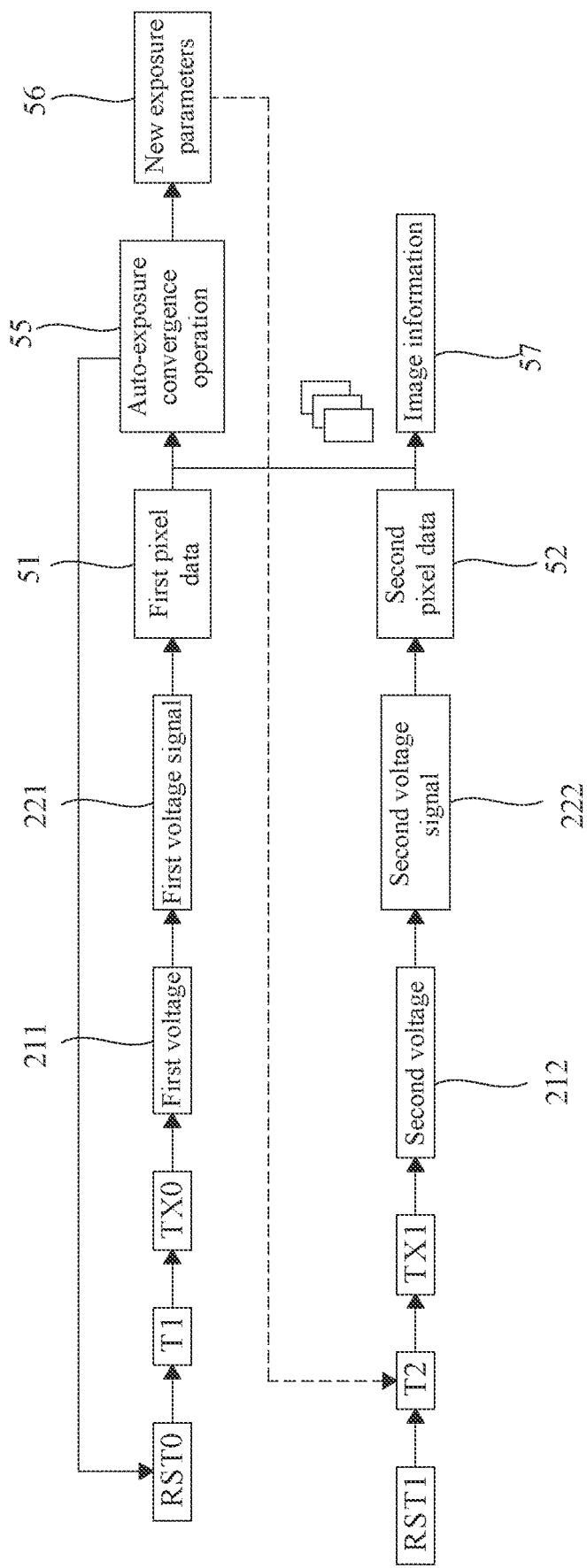
FIG. 8 is a flowchart illustrating the actual implementation of the image sensing method by the image sensing structure according to the first embodiment of the present invention.

Refer to FIGS. 5-8. FIG. 5 is a schematic view of an image sensing structure according to a first embodiment of the present invention; FIG. 6 shows the steps of an image sensing method according to the first embodiment of the present invention; FIG. 7 is a signal schematic view illustrating the image sensing method according to the first embodiment of the present invention; FIG. 8 is a flowchart illustrating the actual implementation of the image sensing method by the image sensing structure according to the first embodiment of the present invention. As shown in FIG. 5, the image sensing structure 100 according to the first embodiment of the present invention includes: a photodiode 11, a floating diffusion 12, a transmission circuit 13, a control circuit 14, an amplification selection circuit 15, and a reset circuit 16.

Specifically, as shown in FIGS. 5-8, the photodiode 11 according to the first embodiment of the present invention includes a first photodiode 111 and a second photodiode 112. It should be further explained that the photodiode 11 is mainly used to photoelectrically convert the incident light into a quantum charge (i.e., electrons) according to the light intensity of the incident light. In the present embodiment, the first photodiode 111 and the second photodiode 112 may be photodiodes with the same structure, and the only difference is that the exposure time of each photodiode is different, but the present invention is not limited to thereto.

Specifically, as shown in FIGS. 5-8, the floating diffusion (FD) node 12 according to the first embodiment of the present invention is coupled to the first transmission circuit 131 and the second transmission circuit 132. In the present embodiment, the floating diffusion node 12 respectively receives the charges accumulated in the first photodiode 111 and the second photodiode 112 to generate different voltages, but the invention is not limited thereto.

Specifically, as shown in FIGS. 5-8, the transmission circuit 13 according to the first embodiment of the present invention is coupled between the photodiode 11 and the floating diffusion node 12, and the transmission circuit 13 includes a first transmission circuit 131 and the second transmission circuit 132. The first transmission circuit 131 is coupled to the first photodiode 111, and the second transmission circuit 122 is coupled to the second photodiode 112. More specifically, the transmission circuit 13 is coupled between the photodiode 11 and the floating diffusion node 12, and is controlled by the transmission signal TX provided by the control circuit 14 to control the charge transfer between the photodiode 11 and the floating diffusion node 12, but the present invention is not limited thereto.

Specifically, in the present embodiment, the image sensing structure 100 according to the present invention has one of a rolling shutter mechanism or a global shutter mechanism. It should be further explained that, in the present embodiment, the present invention has at least two exposure control circuits for controlling the photodiodes 11 respectively, so that the photodiodes 11 have different exposure times. For example, the control circuit 14 makes the photodiodes 11 have different exposure times, so as to be combined with a rolling shutter mechanism to perform separate exposures, and finally image fusion is performed through the image processing circuit 32 to achieve low-latency, fast automatic exposure convergence, and high dynamic range image information. However, the present invention is not limited to thereto.

Specifically, as shown in FIGS. 5-8, the control circuit 14 according to the first embodiment of the present invention is coupled to the transmission circuit 13, and the control circuit 14 includes a first exposure control circuit 141 and a second exposure control circuit 142. The first exposure control circuit 141 is coupled to the transmission circuit 131 and controls the first photodiode 111 to expose for the first exposure time T1 at the first frame rate F1, and the second exposure control circuit 142 is coupled to the second transmission circuit 132 and controls the second photodiode 112 to expose the second exposure time T2 at the second frame rate F2. As such, the first photodiode 111 and the second photodiode 112 generate the first voltage signal 221 and the second voltage signal 222 respectively. In the present embodiment, the second exposure time T2 is 30 times the first exposure time T1, and the first frame rate F1 is 30 times the second frame rate F2, but the invention is not limited thereto.

Specifically, as shown in FIGS. 5-8, the amplification selection circuit 15 according to the first embodiment of the present invention is coupled to the floating diffusion node 12 for converting the voltage of the floating diffusion node 12 into a voltage signal 22. Specifically, according to the amplification selection circuit 15 of the image sensing structure 100 according to the first embodiment of the present invention, the output voltage signal 22 includes a first voltage signal 221 and a second voltage signal 222, and the first voltage signal 221 is generated by exposing the first photodiode 111 for the first exposure time T1, and the second voltage signal 222 is generated by exposing the second photodiode 112 for a second exposure time T2, wherein the first exposure time T1 is shorter than the second exposure time T2, and the first frame rate F1 is greater than the second frame rate F2.

Specifically, as shown in FIGS. 5-8, the reset circuit 16 according to the first embodiment of the present invention is coupled to the floating diffusion node 12 and the control circuit 14, and the reset circuit 16 is used for resetting the charge stored in the floating diffusion node 12. As such, by resetting the charge stored in the photodiode 11, the inability to obtain the correct pixel data when the voltage signal 22 is converted from analog to digital is therefore prevented, and further improves the performance, stability, and accuracy of the image sensing structure 100 according to the first embodiment of the present invention. In the present embodiment, the reset circuit 16 receives the reset signal RST provided by the control circuit 14 to reset the charges stored in the first photodiode 111 and the second photodiode 112 respectively, and, in combination with the transmission signal TX provided by the control circuit 14, to control the first photodiode 111 to expose for the first exposure time T1 at the first frame rate F1 and the second photodiode 112 to exposed for the second exposure time T2 at the second frame rate F2 respectively. However, the invention is not limited thereto.

It should be further explained that, in the present embodiment, the first exposure time T1 is shorter than the second exposure time T2. The first photo diode 111 can complete a plurality of exposures during the time that the second photodiode 112 completes one exposure; that is, the first photodiode 111 has a higher frame rate, so that the image processing circuit 32 of the first embodiment of the present invention can use a plurality of frames of the first pixel data 51 generated by exposing the first photodiode 111 for the first exposure time T1 to perform automatic exposure convergence operation 55 to converge to the automatic exposure target range, which greatly improves the efficiency of the automatic exposure convergence operation 55 of the image sensing structure 100 of the present invention. However, the present invention is not limited to thereto.

For further understanding of the present invention's structural features, the use of technical means, and the expected effect, the use of the first embodiment of the present invention will be described, and it is believed that the present invention can be understood more deeply and specifically. Referring to FIGS. 5-8, the image sensing method for low-latency and fast auto-exposure convergence according to the present invention includes the following steps:

In the first reset step S11, the reset circuit 16 receives a first reset signal RST0 and resets the charge in the first photodiode 111, and then executes the second reset step S12.

In the second reset step S12, the reset circuit 16 receives a second reset signal RST1 and resets the charge in the second photodiode 112, and then executes the first transfer step S13.

In the first transmission step S13, the first transmission circuit 131 receives a first transmission signal TX0, so that when the first transmission circuit 131 is in the on state, the first transmission circuit 131 will transfer the charges accumulated in the first photodiode 111 T to the floating diffusion node 12 to generate a first voltage 211, and then the first readout step S14 is performed.

In the first readout step S14, the amplification selection circuit 15 outputs a first voltage signal 221 according to the first voltage 211. The first voltage signal 221 is generated by exposing the first photodiode 111 for the first exposure time T1, and then executes the convergence step S15.

In the convergence step S15, the image processing circuit 32 generates a corresponding first pixel data 51 according to the first voltage signal 221, and performs the automatic exposure convergence operation 55 with the first pixel data 51 to converge to the automatic exposure target range and obtain new exposure parameters 56, and then uses the new exposure parameters 56 for the automatic exposure convergence operation 55, followed by the second transmission step S16.

In the second transmission step S16, the second transmission circuit 132 receives a second transmission signal TX1 (the second transmission signal TX1 will change according to the new exposure parameters, thereby changing the second exposure time T2), so that when the second transfer circuit 132 is in the on state, the second transmission circuit 132 transfers the charge accumulated in the second photodiode 112 to the floating diffusion node 12 to generate a second voltage 21, and then the second readout step S17 is executed. Moreover, as can be seen in FIG. 7, the timing of the second pulse of the second transmission signal TX1 is between the pulse (31th pulse) of the first reset signal RST0 immediately preceding the second pulse of the second reset signal RST1 and the second pulse of the second reset signal RST1.

In the second readout step S17, the amplification selection circuit 15 outputs a second voltage signal 222 according to the second voltage 212, and the second voltage signal 222 is generated by exposing the second photodiode 112 for a second exposure time T2, and then the image fusion step S18 is executed.

In the image fusion step S18, the image processing circuit 32 generates a corresponding second pixel data 52 according to the second voltage signals 222, and the image processing circuit 32 performs image fusion on the first pixel data 51 and the second pixel data 52 to generate the image information 57.

It should be further explained that the second transmission signal TX1 according to the present invention will be changed according to the new exposure parameters, thereby changing the second exposure time T2. It can be understood that since the first exposure time T1 is shorter than the second exposure time T2, so the image sensing method of the present invention can perform the automatic exposure convergence operation 55 with the first pixel data 51 having a higher frame rate to generate a new exposure parameter 56 for the automatic exposure convergence operation 55. The new exposure parameter 56 changes the second exposure time T2 to implement an image sensing method that can adjust the exposure time according to the environment, achieving the effect of improving the image speed and stability. It should be noted that there is no absolute sequence between the reset, exposure, and readout operations of the first photodiode and the reset, exposure, and readout operations of the second photodiode. The two are independent events that operate in parallel. The step sequence in FIG. 6 is for convenience of illustration, and the present invention is not limited thereto.

It is worth mentioning that, in the present embodiment, the first reset step S11, the first transmission step S13, the first readout step S14 and the convergence step S15 can be executed once or multiple times. When the above steps are performed, it can further ensure that the automatic exposure convergence operation of the present invention converges to the automatic exposure target range, and quickly complete the automatic exposure, which greatly improves the efficiency of the automatic exposure convergence operation 55 of the image sensing structure 100 of the present invention. However, the present invention is not limited thereto.

Refer to FIG. 8, as well as FIGS. 5-7. The actual execution process of the image sensing structure 100 according to the first embodiment of the present invention is described as follows: First, the first reset step S11 is executed, wherein the reset circuit 16 receives the first reset signal RST0 and resets the charges store in the first photodiode 111. Then, the second reset step S12 is executed, wherein the reset circuit 16 receives the second reset signal RST1 and resets the charge in the second photodiode 112. After resetting the first photodiode 111 and passing the duration of the first exposure time T1, the first transmission step S13 is executed, wherein the first transmission circuit 131 receives the first transmission signal TX0, so that when the first transmission circuit 131 is in the on state, the first transmission circuit 131 will transfer the charges accumulated in the first photodiode 111 to the floating diffusion node 12 to generate the first voltage 211. Then, the first readout step S14 is executed, wherein the amplification selection circuit 15 outputs the first voltage signal 221 according to the first voltage 211, following by the execution of the convergence step S15, wherein the image processing circuit 32 performs the automatic exposure convergence operation 55 according to the first voltage signal 221 to converge to the automatic exposure target range, so as to generate new exposure parameters 56. The first reset step S11, the first Transfer step S13, and first readout step S14 are repeatedly executed and perform automatic exposure convergence operation until new exposure parameters 56 are generated. While executing the above steps, the second reset step S12 is concurrently executed to reset the charge in the second photodiode 112, and the second photodiode 112 is exposed for the second exposure time T2 which has been adjusted by the new exposure parameter 56 (i.e., because the second transmission signal TX1 will change according to the new exposure parameter, so the second exposure time T2 will also change with the new exposure parameter 56). After the change, the second transmission step S16 is executed, wherein the second transmission circuit 132 receives the second transmission signal TX1, so that when the second transmission circuit 132 is in the on state, the second transmission circuit 132 will transfer the charges accumulated in the second photodiode 112 to the floating diffusion node 12 to generate the second voltage 24. Then, the second exposure step S17 is executed, and the amplification selection circuit 15 outputs the second voltage signal 222 according to the second voltage 212, wherein the second voltage signal 222 is generated by exposing the second photodiode 112 for the second exposure time T2. Finally, the image fusion step S18 is executed, wherein the image processing circuit 32 generates the corresponding second pixel data 52 according to the second voltage signal 222, and the image processing circuit 32 performs image fusion on the first pixel data 51 and the second pixel data 52 to generate the image information 57. It should be particularly noted that when the second photodiode performs the exposure of the N-th frame but has not yet ended, if the new exposure parameter 56 is received, the exposure time can be updated immediately within the frame, i.e., intra-frame update, the new exposure parameter 56 does not need to wait until the start of the next frame (frame N+1).

Thus, it can be known from the above description that the image sensing method according to the first embodiment of the present invention exposes the first photodiode 111 for a short exposure time T1 and reads out at a high frame rate, while exposing the second photodiode 112 for a longer time 22 and long exposure time T2, which can be adjusted according to the new exposure parameters, and uses tone mapping and exposure fusion to generate fast automatic exposure convergence and high dynamic range image information 27. As such, the present invention performs an automatic exposure convergence operation with a shorter first exposure time T1 and a higher frame rate, utilizes the design of a multi-frame rate array to generate new exposure parameters within one frame of the second frame rate, and performs exposure fusion on the image information after the updated exposure time is adjusted by the exposure parameters (that is, the new exposure parameters will be obtained first within one frame, and then the first pixel information and the second pixel information can be used for image fusion), to achieve low-latency automatic exposure convergence and improve image clarity and other effects.

Other examples of the image sensing device are provided below, so that those skilled in the art of the present invention can more clearly understand possible modification. Components denoted by the same reference numerals as in the above embodiment are substantially the same as those described above with reference to FIGS. 1-8. The same elements, features, and advantages as those of the image sensing device 300 will not be repeated.

Figure 9:
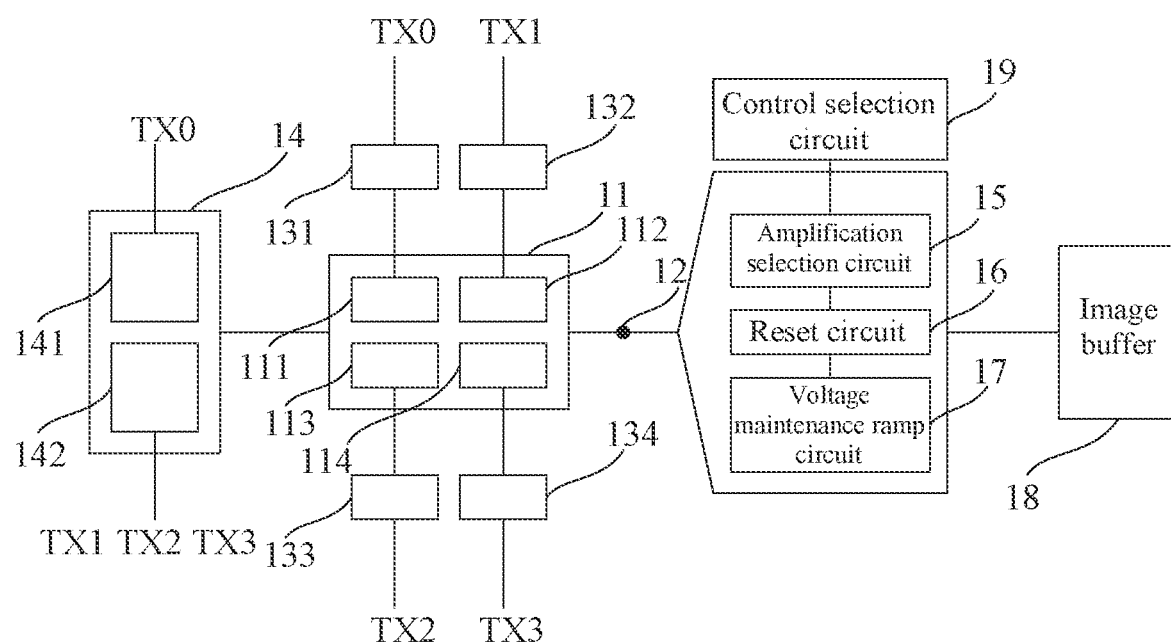
FIG. 9 is a schematic view of an image sensing structure according to a second embodiment of the present invention.
Figure 10:
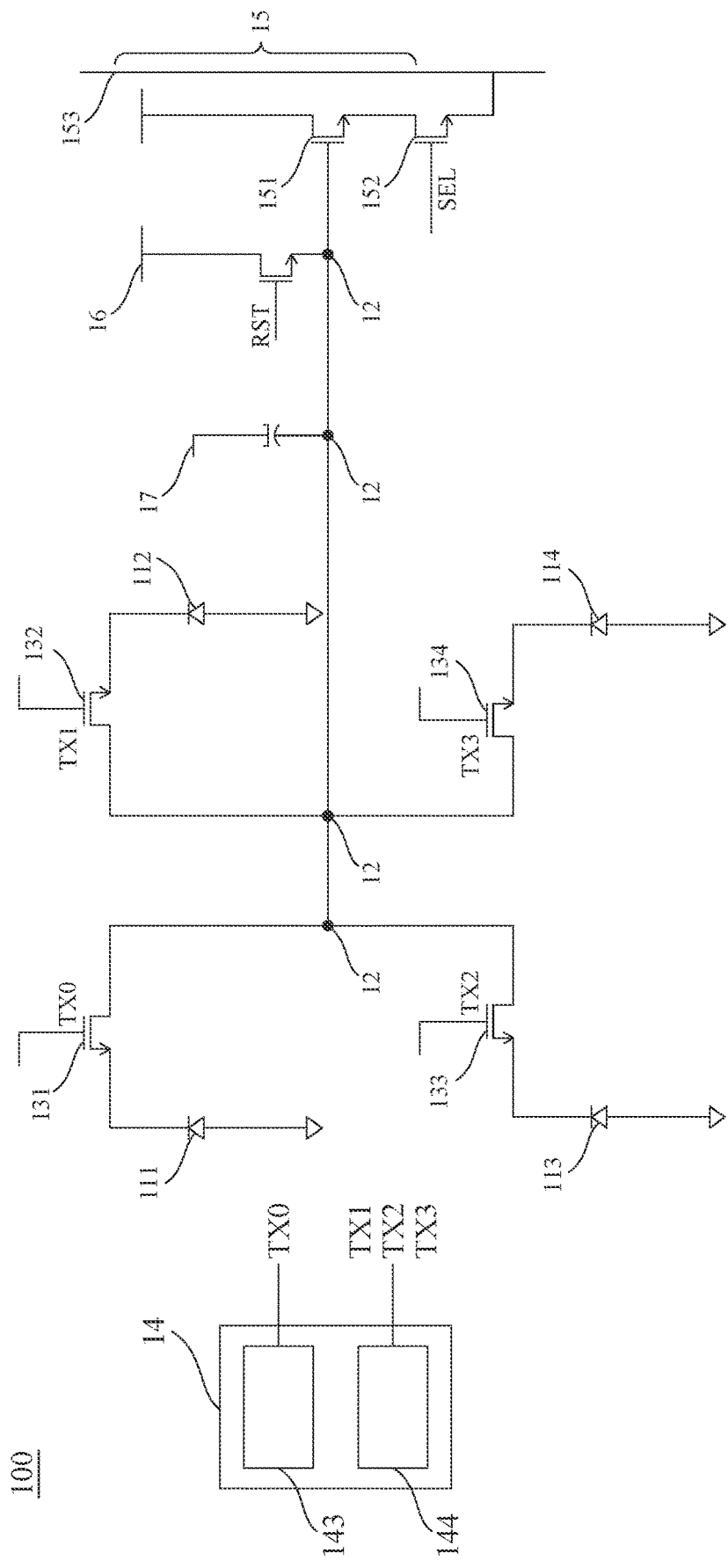
FIG. 10 is a circuit diagram of an image sensing structure according to the second embodiment of the present invention.

Refer to FIGS. 9-10. FIG. 9 is a schematic view of an image sensing structure according to a second embodiment of the present invention; FIG. 10 is a circuit diagram of an image sensing structure according to the second embodiment of the present invention. As shown in FIGS. 9-10, the image sensing structure 100 according to the second embodiment of the present invention includes: a photodiode 11, a floating diffusion node 12, a transmission circuit 13, a control circuit 14, an amplification selection circuit 15, a reset circuit 16, a voltage maintenance ramp circuit 17, an image buffer 18, and a control selection circuit 19, wherein the photodiode 11 according to the second embodiment of the present invention includes a first photodiode 111, a second photodiode 112, a third photodiode 113, and a fourth photodiode 114; the transmission circuit 13 includes a first transmission circuit 131, a second transmission circuit 132, a third transmission circuit 133, and a fourth transmission circuit 134.

Specifically, as shown in FIGS. 9-10, in the present embodiment, the third photodiode 113 according to the second embodiment of the present invention is coupled to the third transmission circuit 133, the fourth photodiode 114 is coupled to the fourth transmission circuit 134, and both the third transmission circuit 133 and the fourth transmission circuit 134 are coupled to the second exposure control circuit 142, so that the second exposure control circuit 142 controls the third photodiode 113 and the four photodiodes 114 to expose for the second exposure time T2, but the present invention is not limited thereto.

It should be further explained that, as shown in FIGS. 9-10, in the present embodiment, a white light filter 41, a red light filter 42, a green light filter 43, and a blue light filter 44 can be arranged on the photodiode 11 according to the second embodiment of the present invention. The white light filter 41 is arranged on the first photodiode 111, the red light filter 42 is arranged on the second photodiode 112, the green light filter 43 is disposed on the third photodiode 113, and the blue light filter 44 is disposed on the fourth photodiode 114. As such, the first photodiode 111 can generate a first voltage signal with a wavelength within the wavelength range of white light, and the second photodiode 112 can generate a second voltage signal with a wavelength within the wavelength range of red light. The photodiode 113 can generate a third voltage signal with a wavelength within the wavelength range of green light, and the fourth photodiode 114 can generate a fourth voltage signal with a wavelength within the wavelength range of blue light.

Specifically, as shown in FIGS. 9-10, the amplification selection circuit according to the second embodiment of the present invention is coupled to an amplification transistor 151, a selection transistor 152, and a signal line 153, wherein the gate of the amplification transistor 151 is coupled to the floating diffusion node 12, and the amplification transistor 151 is coupled to the signal line 153 via the selection transistor 152. When the selection transistor 152 receives an external selection signal SEL provided by the control selection circuit 19 to make the selection transistor 152 in the on state, the amplification transistor 151 amplifies the voltage of the floating diffusion node 12 and generates a voltage signal to be transmitted to the signal line 153, but the present invention is not limited thereto.

Specifically, as shown in FIGS. 9-10, according to the voltage maintenance ramp circuit 17 of the second embodiment of the present invention, one end of the voltage maintenance ramp circuit 17 is coupled to the floating diffusion node 12, and the voltage maintenance ramp circuit 17 is used for adjusting the voltage of the floating diffusion node 12 and converting into a digital pixel value for transmission to the image processing circuit 32. It should be further explained that, in the present embodiment, the voltage maintenance ramp circuit 17 only includes one capacitor. The capacitor is coupled to the amplification transistor 151, but the invention is not limited thereto.

Specifically, as shown in FIGS. 9-10, the image buffer 18 according to the second embodiment of the present invention is coupled to the image processing circuit 32, and the image buffer 18 is mainly used to store pixel data. In the present embodiment, the image buffer 18 may be a digital frame buffer to store the first voltage signal, the second voltage signal, the third voltage signal, and the fourth voltage signal respectively. Then, the image fusion is performed on these voltage signals by the image processing circuit 32 to generate the high dynamic range image information 57, but the present invention is not limited thereto.

Figure 11:
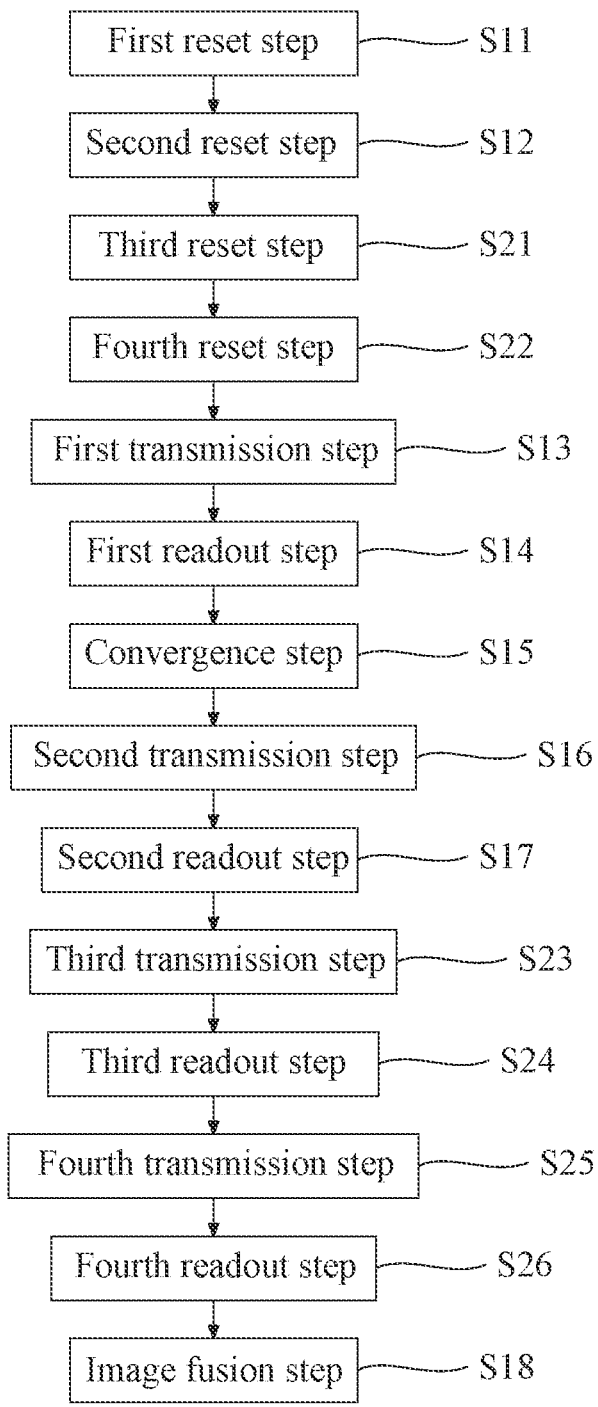
FIG. 11 is a view of the steps of the image sensing method according to a second embodiment of the present invention.
Figure 12:
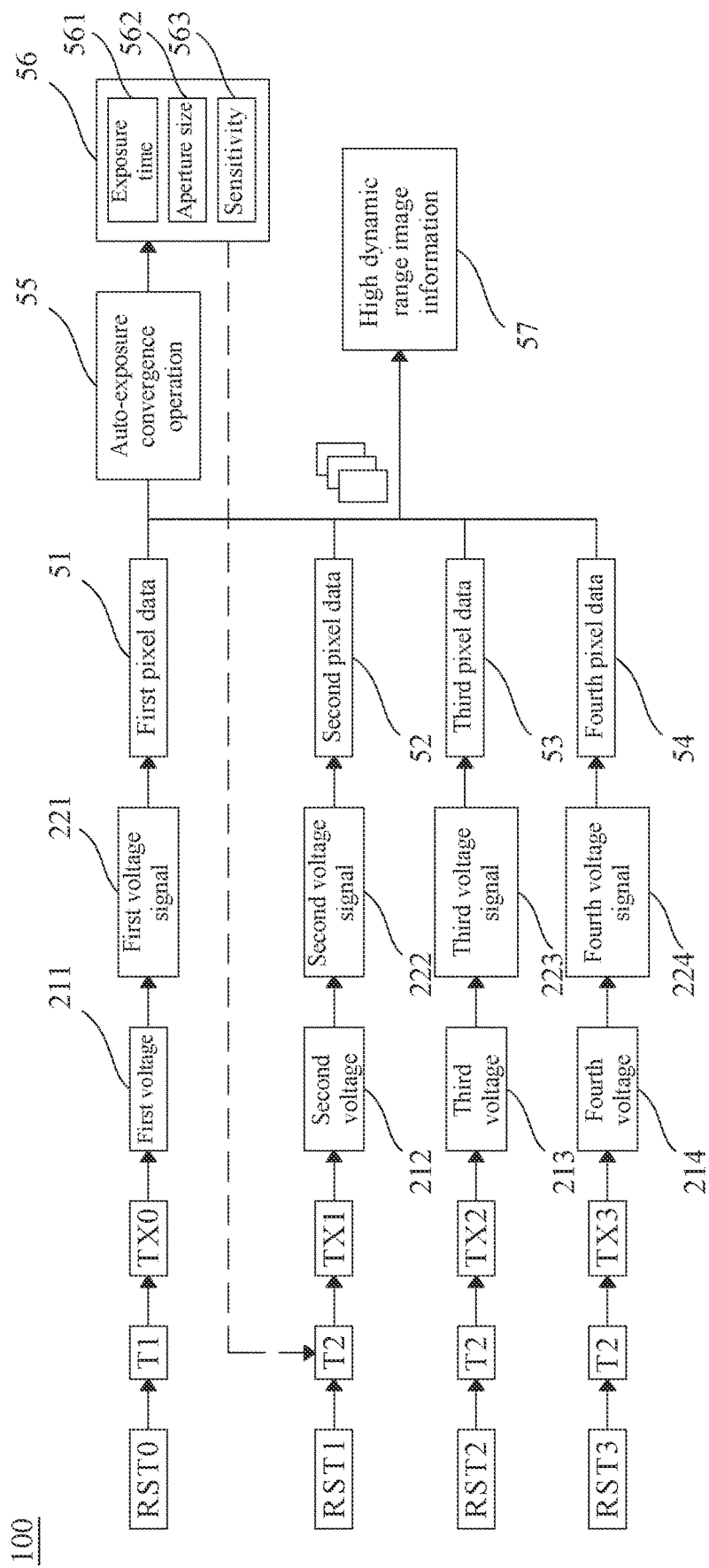
FIG. 12 is a schematic view illustrating the actual execution process of the image sensing method according to the present invention.
Figure 13:
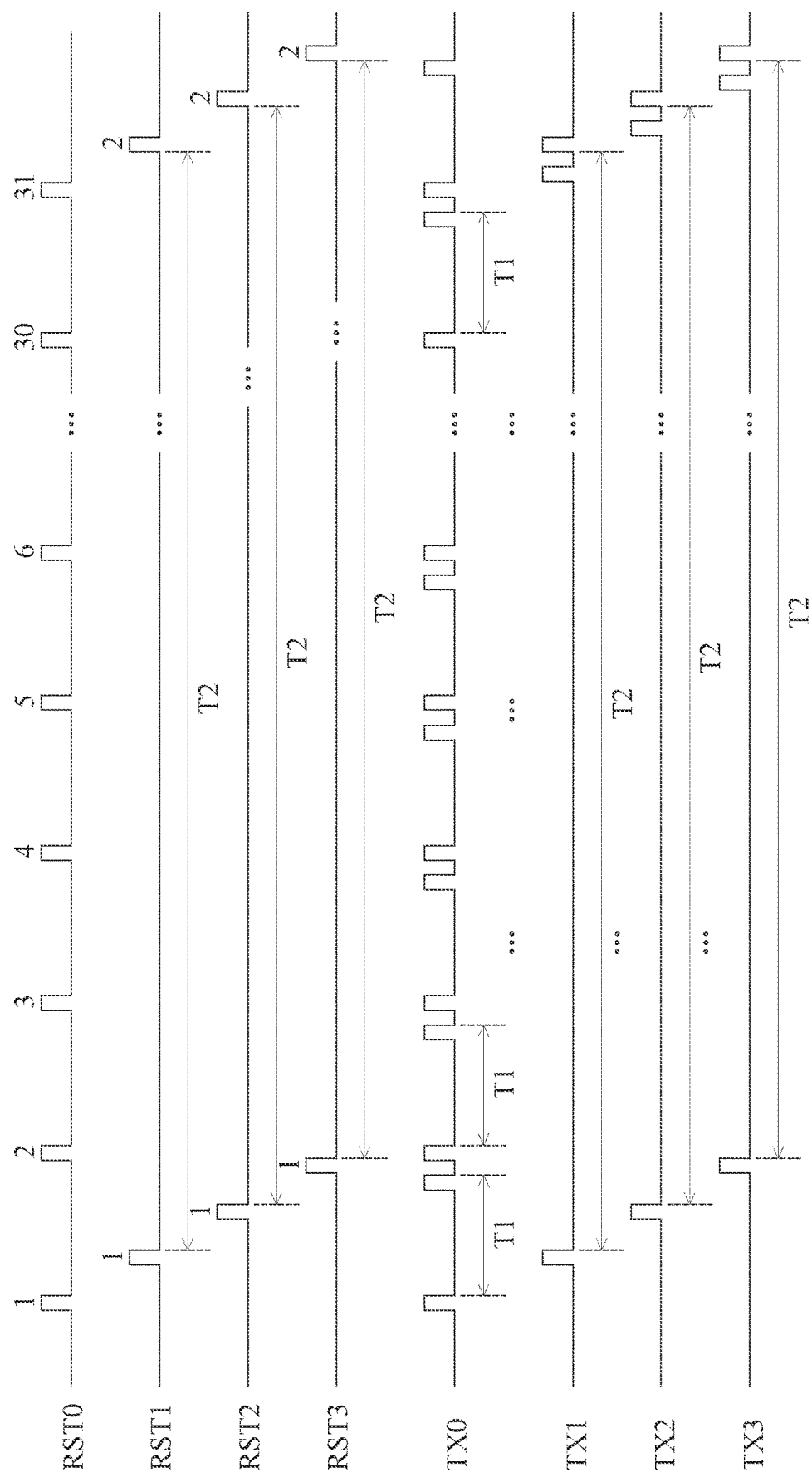
FIG. 13 is a timing diagram illustrating a reset signal and a transmission signal of the image sensing method according to the second embodiment of the present invention.

For further understanding of the present invention's structural features, use of technical means and the expected effect, the use of the present invention will be described so that the present invention can be understood more deeply and specifically. Refer to FIGS. 11-13, FIG. 11 is a flowchart of the steps of the image sensing method according to the second embodiment of the present invention; FIG. 12 is a schematic view illustrating the actual execution process of the image sensing method according to the present invention; FIG. 13 is a schematic view illustrating the timing of the reset signal and the transmission signal of the image sensing method of the second embodiment. According to the second embodiment of the present invention, the image sensing method with low-latency and fast automatic exposure convergence includes the following steps:

In the first reset step S11, the reset circuit 16 and the first transmission circuit 131 simultaneously receive the first reset signal RST0 and reset the charge in the first photodiode 111, and then the second reset step S12 is executed.

In the second reset step S12, the reset circuit 16 and the second transmission circuit 132 simultaneously receive the second reset signal RST1 and reset the charge in the second photodiode 112, and then the third reset step S21 is executed.

In the third reset step S21, the reset circuit 16 and the third transmission circuit 133 simultaneously receive the third reset signal RST2 and reset the charge in the third photodiode 113, and then the fourth reset step S22 is executed.

In the fourth reset step S22, the reset circuit 16 and the fourth transmission circuit 134 simultaneously receive the fourth reset signal RST3 and reset the charge in the fourth photodiode 114, and then the first transmission step S13 is executed.

In the first transmission step S13, the first transmission circuit 131 receives the first transmission signal TX0, so that when the first transmission circuit 131 is in the on state, the first transmission circuit 131 will transfer the charges accumulated in the first photodiode 111 to the floating diffusion node 12 to generate the first voltage 211, and then the first selection step S14 is executed.

In the first readout step S14, the amplification selection circuit 15 outputs the first voltage signal 221 according to the first voltage 211. The first voltage signal 221 is generated by exposing the first photodiode 111 for the first exposure time T1, and then the convergence step S15 is executed.

In the convergence step S15, the image processing circuit 32 generates the corresponding first pixel data 51 according to the first voltage signal 221, and perform an automatic exposure convergence operation 55 with the first pixel data 51 to generate a new exposure parameter 56, i.e., by adjusting any combination of gain, exposure time 561, aperture size 562, and sensitivity 563 to converge to the automatic exposure target range, and then the second transmission step S16 is executed.

In the second transmission step S16, the second transmission circuit 132 receives the second transmission signal TX1 (the second transmission signal TX1 will change according to the new exposure parameters, thereby changing the second exposure time T2), so that when the second transmission circuit 132 is in the on state, the second transmission circuit 132 transfers the charge accumulated in the second photodiode 112 to the floating diffusion node 12 to generate the second voltage 212, and then the second selection step S17 is executed.

In the second readout step S17, the amplification selection circuit 15 outputs the second voltage signal 222 according to the second voltage 212. The second voltage signal 222 is generated by exposing the second photodiode 112 for a second exposure time T2, and then the third transmission step S23 is executed.

In the third transmission step S23, the third transmission circuit 133 receives the third transmission signal TX2 (the third transmission signal TX2 will change according to the new exposure parameters, thereby changing the second exposure time T2), so that when the third transmission circuit 133 is in the on state, the third transmission circuit 133 transfers the charge accumulated in the third photodiode 113 to the floating diffusion node 12 to generate the third voltage 213, and then the third selection step S24 is executed. Moreover, as shown in FIG. 13, the timing of the second pulse of the third transmission signal TX2 is between the second pulse of the second reset signal RST1 and the second pulse of the third reset signal RST2.

In the third readout step S24, the amplification selection circuit 15 outputs the third voltage signal 223 according to the third voltage 213, and the third voltage signal 223 is generated by exposing the third photodiode 113 for the second exposure time T2, and then the fourth transmission step S25 is executed.

In the fourth transmission step S25, the fourth transmission circuit 134 receives the fourth transmission signal TX3 (the fourth transmission signal TX3 will be changed according to the new exposure parameters, thereby changing the second exposure time T2), so that when the fourth the transmission circuit 134 is in the on state, the fourth transmission circuit 134 transfers the charge accumulated in the fourth photodiode 114 to the floating diffusion node 12 to generate the fourth voltage 214, and then the fourth exposure step S26 is executed. Moreover, as shown in FIG. 13, the timing of the second pulse of the fourth transmission signal TX3 is between the second pulse of the third reset signal RST2 and the second pulse of the fourth reset signal RST3.

In the fourth readout step S26, the amplification and selection circuit 15 outputs the fourth voltage signal 224 according to the fourth voltage 214. The fourth voltage signal 224 is generated by exposing the fourth photodiode 114 for the second exposure time T2, and then the image fusion step S18 is executed.

In the image fusion step S18, the image processing circuit 32 generates corresponding second pixel data 52, third pixel data 53, and fourth pixel data 54 according to the second voltage signal 222, the third voltage signal 223, and the fourth voltage signal 224 respectively, and the image processing circuit 32 performs image fusion on the first pixel data 51, the second pixel data 52, the third pixel data 53, and the fourth pixel data 54 to generate the image information 57.

It should be further explained that, according to the present invention, the second transmission signal TX1, the third transmission signal TX2, and the fourth transmission signal TX3 will be changed according to the new exposure parameters, thereby changing the second exposure time T2. It should also be understood that since the first exposure time T1 is shorter than the second exposure time T2, and the first frame rate is higher than the second frame rate, the image sensing method of the present invention can perform automatic exposure convergence operation 55 with the first pixel data 51 of a higher frame rate, and change the second exposure time T2 according to the updated exposure parameters 56, and update the gain and exposure time length when the second exposure is in progress but not yet completed. As such, image sensing method can adjust the exposure time according to the environment, achieve low-latency with fast automatic exposure convergence, and improve image clarity.

It is worth mentioning that, in the present embodiment, the first reset step S11, the second reset step S12, the third reset step S21, and the fourth reset step S22 can be performed once or multiple times. When the above steps are executed multiple times, it can be further ensured that the automatic exposure convergence operation of the present invention converges to the automatic exposure target range, and the automatic exposure can be completed quickly. It can be understood that the image processing circuit 32 of the present invention can complete the convergence of the automatic exposure algorithm within a period of image capturing, that is, within one frame. Compared with the prior art that requires more than two image capture operations, the present invention effectively improves the stability and efficiency of the image sensing structure of the present invention. However, the present invention is not limited thereto.

It should be further explained that, as shown in FIG. 13, in the present embodiment, the second photodiode 112, the third photodiode 113, and the fourth photodiode 114 are all exposed for a second exposure time T2 to generate the second pixel data 52, the third pixel data 53, and the fourth pixel data 54 respectively. As such, the image sensing structure 100 of the second embodiment of the present invention can complete the convergence through the automatic exposure algorithm to adjust any combination the gain, the exposure time 561, the aperture size 562, and the sensitivity 563 of the image sensing structure 100, and generating the image information 57 by performing image fusion, so as to achieve the objective of quickly completing the automatic exposure convergence. Even when the external light undergoes sudden and extreme change, clear and distinct picture details can still be presented, but the present invention is not limited thereto.

Figure 14A:
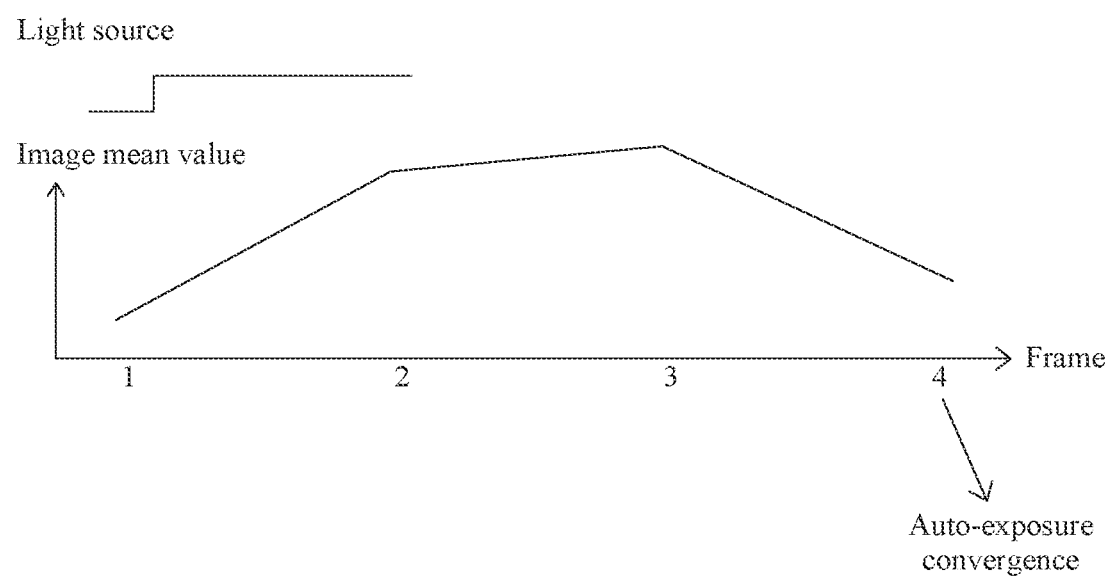
FIG. 14A is a schematic view illustrating the convergence of automatic exposure in the prior art.
Figure 14B:
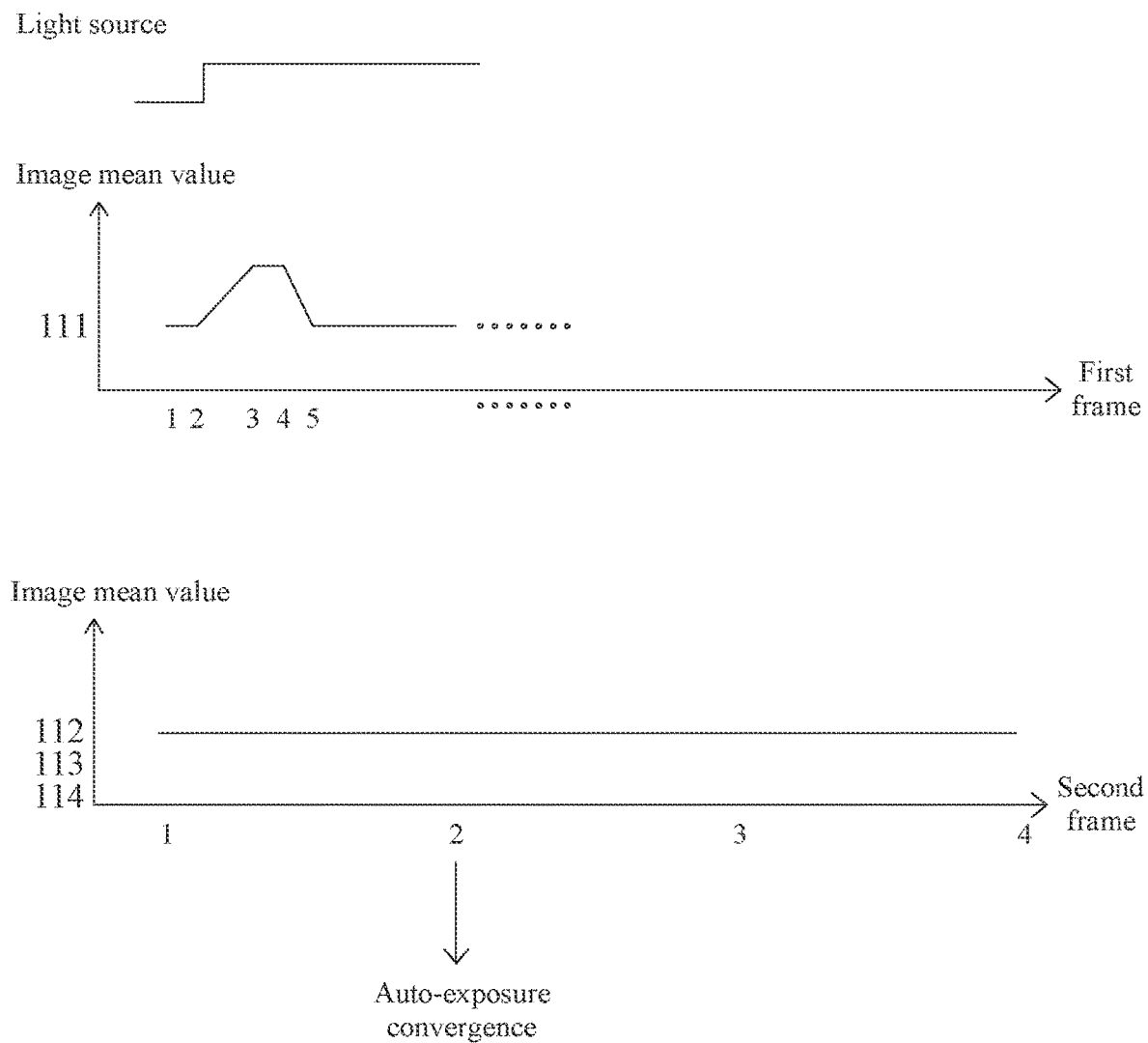
FIG. 14B is a schematic view illustrating automatic exposure convergence performed by the image sensing structure of the present invention.

Refer to FIG. 14A and FIG. 14B. FIG. 14A is a schematic view illustrating the automatic exposure convergence of the conventional technology; FIG. 14B is a schematic view illustrating the automatic exposure convergence of the image sensing structure of the present invention. As shown in FIG. 14A and FIG. 14B, when the light source changes, the problem with the conventional automatic exposure algorithm is that all pixels have the same exposure time and the same frame rate, and therefore, the automatic exposure convergence can only be performed after the pixels are exposed. However, the image sensing structure 100 according to the second embodiment of the present invention can use the first photodiode 111 to expose the first exposure time T1 at the first frame rate F1 to complete the automatic exposure convergence and configure new exposure parameters to make the average value of the pixel data (e.g., image mean value) converge to the automatic exposure target range. In the present embodiment, the brightness is represented by integers from 0 to 255, with 0 the darkest and 255 the brightest, and the image mean value of the pixel data in the present invention refers to taking the average of the pixel brightness of the entire picture. For example, if the entire image is completely black, the value will be 0, and conversely, if the entire image is completely white, the value will be 255. As shown in FIG. 14B, when the light source suddenly becomes stronger, because the first pixel data 51 has a shorter exposure time and a higher frame rate, the present invention can realize the operation of fast automatic exposure convergence, so that the curve originally becomes larger due to the stronger light. However, after the light intensity sensed by the sensing device is increased, the automatic exposure convergence operation is started, and the sensed intensity value is slowly decreased. In the present embodiment, the first pixel data 51 performs 30 exposure operations within one frame of the second frame rate, but the present invention is not limited thereto. Compared with the prior art, it is apparent that the present embodiment can have a higher exposure rate through the first photodiode 111 in a state where the lighting environment changes drastically, that is, a higher frame rate. The present invention can use the first voltage signal 221 generated by the first photodiode 111 to execute the automatic exposure convergence operation 55 to quickly complete the automatic exposure convergence, realize the effect of low-latency and fast automatic exposure convergence, and make the image shows clear details under various illumination environments.

In FIG. 14B, the X-axis of the middle figure is the W-sub frame, which is the output of the first pixel data 51, and the convergence operation will be completed before the image labelled as 2 in the X-axis direction on the figure below, and the bottom figure shows a horizontal line. In addition, the Y-axis direction shows the image mean value. For example, in a computer, an integer ranging from 0 to 255 represents the brightness of a small spot, with 0 the darkest and 255 the brightest, and the image mean value is to take the average of the pixel brightness of the entire picture. If the entire picture is completely black, the image mean value will be 0; if the entire picture is completely white, the image mean value will be 255. The upper figure represents a sudden increase in light intensity, for example, a light source suddenly becomes brighter. The middle figure means that the first pixel data 51 will always come out (because the exposure time is short), and there will be a phenomenon of automatic exposure convergence, so that the curve in the figure originally increases the mean value due to the light becoming stronger, the automatic exposure convergence operation is turned on, and slowly decreases the average value. Taking the present invention as an example, the first pixel related to the first pixel data 51 will do 30 exposures within one frame (the third figure, the x-axis value is between 1 and 2 within the time of one frame), and there will be 30 first pixel data 51. These data are the numbers on the X-axis of the middle figure. The figure below shows that the mean value of the entire picture will not increase as the light becomes stronger, compared with FIG. 14A.

Figure 15:
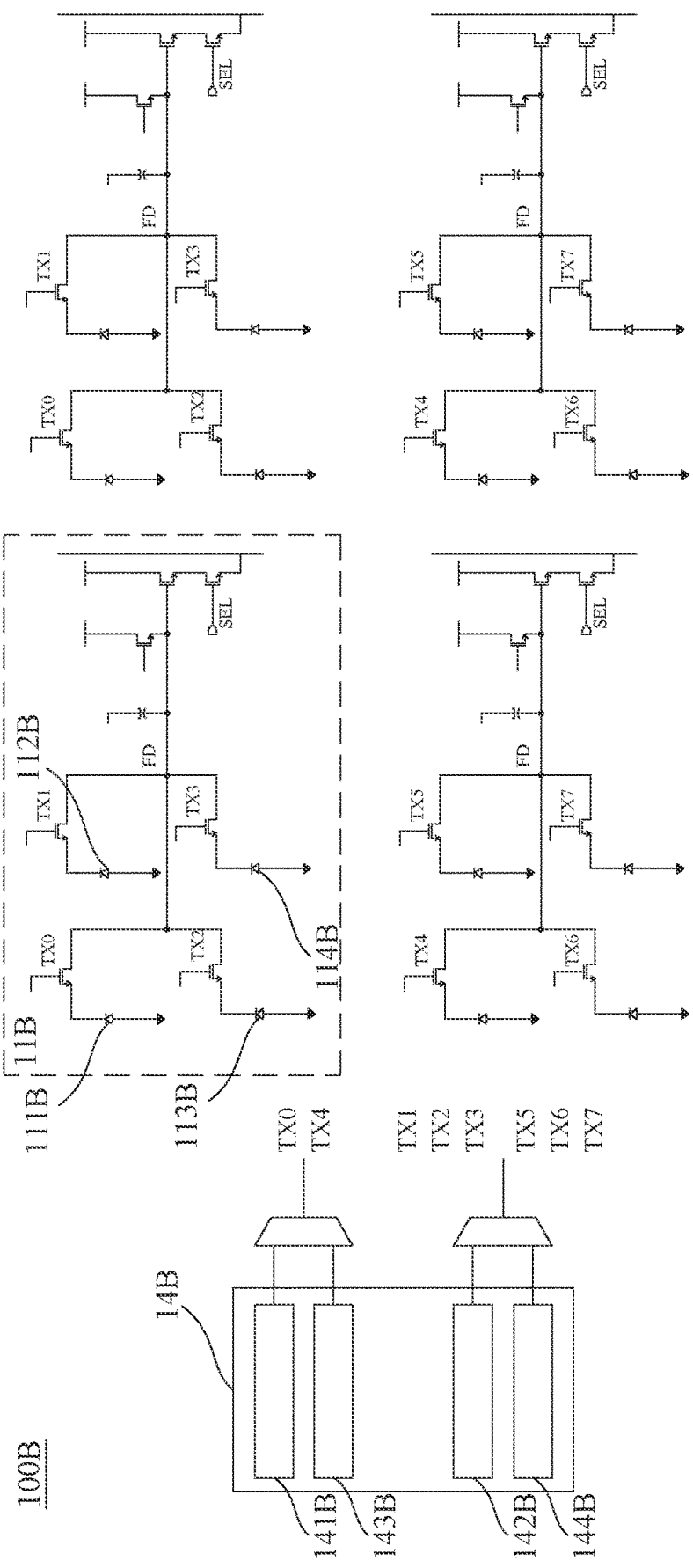
FIG. 15 is a schematic view of an image sensing structure according to a third embodiment of the present invention.
Figure 16:
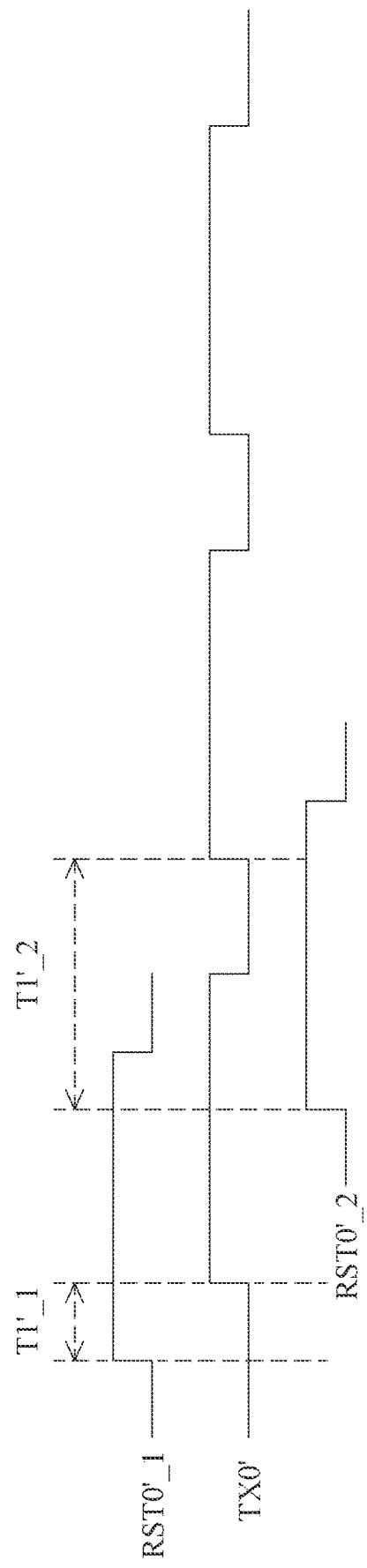
FIG. 16 is a partial timing diagram illustrating a reset signal and a transmission signal of an image sensing structure according to the third embodiment of the present invention.

Refer to FIGS. 15-16. FIG. 15 is a schematic view of an image sensing structure according to a third embodiment of the present invention; FIG. 16 illustrates the partial timing of the reset signal and the transmitted signal of the image sensing structure according to the third embodiment of the present invention. Compared with the first embodiment, the main difference of the third embodiment is that the transmission signal TX0' of the image sensing structure 100B according to the third embodiment of the present invention has a fixed transmission rate when the exposure time changes, that is, a fixed frame rate readout operation. At this time, the control circuit 14B must include at least two exposure control circuits to control the exposure time of a single photodiode 11B. As shown in FIG. 16, with two independent exposure control circuits, for example, two independent address decoders, the control circuit 14B can generate asynchronous first reset signal RST0'_1 and second reset signal RST0'_2 to adjust the photodiode 11B to generate the first exposure time T1'_1 and the second exposure time T1' 2. It can be understood that the user can control the exposure time of the photodiode 11B through the transmission signal TX0', the second reset signal RST0'_2, and the first reset signal RST0'_1 generated the control circuit 14B, but the present invention is not limited thereto. It should be noted that the first reset signal RST0' 1 is an interval covering the RST signals of all the first photodiodes when the exposure time is T1' 1. The second reset signal RST0'_2 is an interval covering all the RST signals of the first photodiodes when the exposure time is T1' 2. The transmission signal TX0' is an interval covering all TX signals of the first photodiodes under the readout operation at a fixed frame rate. The operation timing of the second photodiode is the same by analogy, and will not be repeated here.

Specifically, as shown in FIG. 15, in the present embodiment, when the transmission signal TX' is under the condition of changes in the exposure time, to have a fixed frame rate readout operation, the control circuit 14B must include at least two exposure control circuits to control the exposure time of a single photodiode 11, therefore, the image sensing structure 100 further includes a third exposure control circuit 143B and a fourth exposure control circuit 144B, so that the first photodiode 111B is exposed for the first exposure time T1', and T1' can be T1'_1 or T1'_2 of different exposure time lengths, and the second photodiode 112B, the third photodiode 112B, the third photodiode diode 113B, and fourth photodiode 114B are exposed for a second exposure time T2', and T2' can be T2'_1 or T2'_2 of different exposure time lengths. As such, the control circuit 14B can select the first exposure control circuit 141B or the third exposure control circuit 143B to control the reset signal of the first photodiode 111B, so that the first exposure time T1' can be changed from T1'_1 to T1'_2 during the readout operation of the fixed frame rate. Moreover, the control circuit 14B can select the second exposure control circuit 142B or the fourth exposure control circuit 144B to control the reset signals of the second photodiode 112B, the third photodiode 113B, and the fourth photodiode 114B in order to change the second exposure time T2' from T2'_1 to T2'_2 during the fixed frame rate readout operation. Thereby, the image sensing structure 100 according to the present invention can be applied in the environment of a fixed frame rate readout operation by adding an independent exposure control circuit, so that the image sensing structure 100 of the present invention can achieve wide applicability, but the present invention is not limited thereto.

The above is to illustrate the implementation of the present invention by means of specific embodiments. Those skilled in the art can easily understand other advantages and effects of the present invention from the content disclosed in the present specification.

The above description is only preferred embodiments of the present invention, and is not intended to limit the scope of the present invention; all other equivalent changes or modifications that do not depart from the spirit disclosed by the present invention should be included in the following claims within the scope of the patent.

What is claimed is:

1. An image sensing device, comprising:
    an image sensing array, further comprising a plurality of sensing units, for generating a plurality of pixel data respectively, each of the plurality of sensing units having a photodiode, a transmission circuit coupled to the photodiode for receiving a transmission signal and a reset circuit coupled to the transmission circuit for receiving a reset signal;
    an image processing circuit, coupled to the image sensing array;
    wherein, the plurality of pixel data comprises a first pixel data and a second pixel data, the first pixel data is generated by exposing for a first exposure time, and the second pixel data is generated by exposing for a second exposure time, the first exposure time is shorter than the second exposure time, and the image processing circuit performs an automatic exposure convergence operation through the first pixel data to generate a plurality of new exposure parameters of the automatic exposure convergence operation, and adjusts the second exposure time according to the new exposure parameters, so that the second pixel data is the pixel data with a changed exposure time; and
    wherein the plurality of the sensing units comprises a first sensing unit and a second sensing unit, the reset circuit of the first sensing unit receives a first reset signal, the transmission circuit of the first sensing unit receives a first transmission signal, the reset circuit of the second sensing unit receives a second reset signal, and the transmission circuit of the second sensing unit receives a second transmission signal, and timing of a second pulse of the second transmission signal is between a pulse of the first reset signal immediately preceding a second pulse of the second reset signal and the second pulse of the second reset signal.

2. The image sensing device according to claim 1, wherein the image processing circuit performs image fusion according to the plurality of pixel data with different exposure times to generate an image.

3. The image sensing device according to claim 1, wherein in each of the plurality of sensing units, the reset circuit resets charges in the photodiode according to the reset signal, and the transmission circuit converts the charges accumulated in the photodiode into the pixel data of a corresponding sensing unit according to the transmission signal.

4. The image sensing device according to claim 1, wherein the plurality of the sensing units further comprises a third sensing unit, the reset circuit of the third sensing unit receives a third reset signal, the transmission circuit of the third sensing unit receives a third transmission signal, and timing of a second pulse of the third transmission signal is between the second pulse of the second reset signal and a second pulse of the third reset signal.

5. The image sensing device according to claim 4, wherein the plurality of the sensing units further comprises a fourth sensing unit, the reset circuit of the fourth sensing unit receives a fourth reset signal, the transmission circuit of the fourth sensing unit receives a fourth transmission signal, and timing of a second pulse of the fourth transmission signal is between the second pulse of the third reset signal and a second pulse of the fourth reset signal.

6. The image sensing device according to claim 5, further comprising a plurality of filters, and the filters comprising a white filter, a red filter, a green filter, and a blue filter; wherein the white light filter is disposed on the first sensing unit, the red light filter is disposed on the second sensing unit, the green light filter is disposed on the third sensing unit, and the blue light filter is disposed on the fourth sensing unit.

7. The image sensing device according to claim 1, wherein the sensing units further comprise a control circuit coupled to the transmission circuit and the reset circuit, and the control circuit is used to generate the transmission signal and the reset signal.

8. The image sensing device according to claim 7, wherein the control circuit comprises a first exposure control circuit and a second exposure control circuit, the first exposure control circuit is used to generate the first transmission signal and the first reset signal, and the second exposure control circuit is used to generate the second transmission signal and the second reset signal.

9. The image sensing device according to claim 1, wherein the image sensing array is a multi-frame rate array, the image processing circuit uses the first pixel data which has a shorter exposure time and a higher frame rate than the second pixel data to perform the automatic exposure convergence operation, and when the first pixel data finishes the automatic exposure convergence after a time period of a plurality of first frames of the first pixel data, the second pixel data is still within a time period of one frame of the second pixel data.

10. The image sensing device according to claim 1, further comprising an image buffer coupled to the image processing circuit, for storing the plurality of pixel data.

* * * * *